Feb. 23, 1954  S. GORE  2,670,229
VIBRATION WASHER AND STEERING KNUCKLE
Filed March 30, 1953
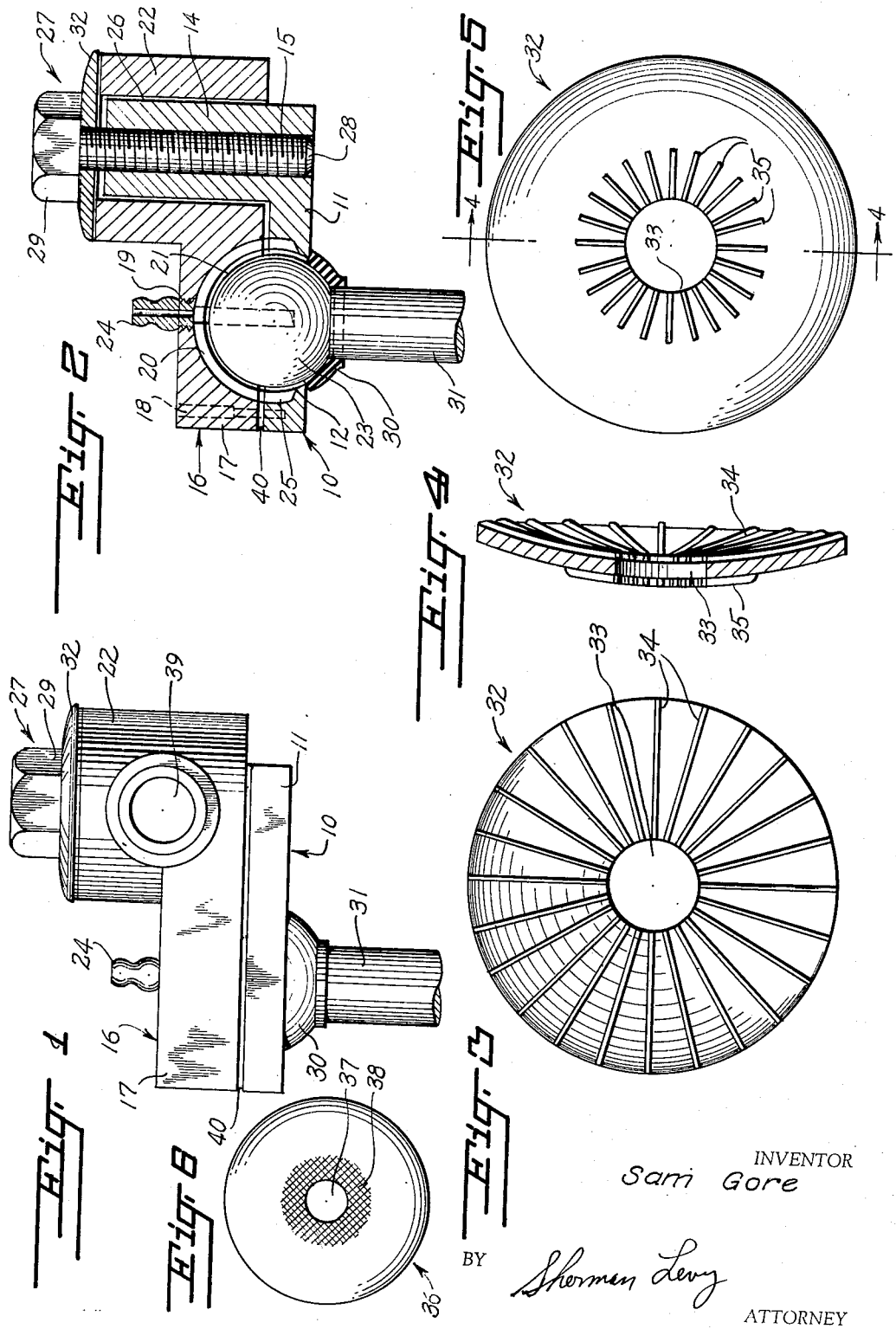
INVENTOR
Sam Gore
BY Sherman Levy
ATTORNEY Patented Feb. 23, 1954

2,670,229

UNITED STATES PATENT OFFICE 2,670,229

VIBRATION WASHER AND STEERING KNUCKLE

Sam Gore, Vero Beach, Fla.

Application March 30, 1953, Serial No. 345,661

4 Claims. (Cl. 287—90)

This invention relates to a vehicle, and more particularly to a vibration washer and steering knuckle for a vehicle.

The object of the invention is to provide a steering knuckle assembly which will enable vehicles to be turned quickly and readily.

Another object of the invention is to provide a steering mechanism which is ruggedly and compactly constructed whereby the wheels of the vehicle can be accurately turned or controlled, the steering knuckle including a vibration washer which is constructed so that the parts will not accidentally work loose during use of the mechanism of the present invention.

Still another object of the invention is to provide an adjustable steering knuckle which includes means for providing sufficient lubrication to the moving parts and wherein the device can be easily adjusted to eliminate any shimmy action which may develop during use.

A still further object of the invention is to provide an adjustable steering knuckle and vibration washer which can be readily adjusted and which can be constructed from scrap metal for emergency repairs, the present invention adapted to be used on any vehicle which requires independent steering and which is subject to shock, impact, and vibration which ultimately leads to shimmy, there being a means for lubricating the moving parts so that the life expectancy of the invention will be greatly increased.

A further object of the invention is to provide a vibration washer and adjustable steering knuckle which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the steering knuckle of the present invention.

Figure 2 is a vertical sectional view taken through the steering knuckle.

Figure 3 is a bottom plan view of the vibration washer.

Figure 4 is a sectional view taken on the line 4—4 of Figure 5.

Figure 5 is a top plan view of the vibration washer.

Figure 6 is a plan view of a modified vibration washer.

Referring in detail to the drawings, the numeral 10 designates a bracket which may be fabricated of any suitable material such as metal, and the bracket 10 includes a straight portion 11 that is provided with a socket 12. Arranged at right angles with respect to the straight portion 11 and secured thereto or formed integral therewith is a finger 14 which is provided with a longitudinally extending threaded bore 15.

The numeral 16 designates a body member which is arranged contiguous to the bracket 10, Figure 2, and the body member 16 includes a plate portion 17 which may be secured to the straight portion 11 by suitable securing elements such as pins 18. A suitable opening 19 is provided in the plate portion 17 whereby grease or oil or other suitable lubricant can be introduced into a plurality of grooves or veins 20. The grooves 20 communicate with a socket 21, and the socket 21 cooperates with the socket 12 for pivotally or rotatably receiving therein a ball 23. An apertured bushing 24 may be arranged in engagement with the opening 19 whereby the lubricant can be introduced into the grease veins 20 and also into grease veins 25 which are formed in the bracket 10.

Formed integral with the plate portion 17 or secured thereto is a sleeve 22 which is provided with a cut-out or chamber 26 for receiving therein the finger 14. A suitable securing element such as a bolt 27 has a threaded stem 28 arranged in threaded engagement with the bore 15 in the finger 14. The bolt 27 has a head 29 on its outer end.

Secured to the movable ball 23 is a shank 31, and surrounding the exterior portion of the ball 23 is a resilient skirt 30. The rubber skirt 30 serves to maintain the oil or grease in the lubrication veins and also serves to prevent dirt from entering the interior of the device.

Circumposed on the threaded stem 28 and interposed between the head 29 and the sleeve 22 is a vibration washer 32. The washer 32 includes a central opening 33 for the projection therethrough of the stem 28, and arranged on one side of the washer 32 is a plurality of radially extending ribs 34, there being ribs 35 on the other side of the washer. These ribs 34 and 35 serve to insure that the parts will not accidentally work loose even though the present invention may be subjected to great vibration or shock. Instead of using the washer 32, shown in Figures 3, 4 and 5, the washer 36, shown in Figure 6, may be used. The washer 36 again includes the central opening 37 for the projection therethrough of the stem 28, and a portion of the surface of the washer 36 may be knurled as at 38 to insure that there will be better gripping action between the washer and its adjacent parts. An arm 39 extends from the sleeve 22, and the arm 39 may be connected to the steering rod of a vehicle. The shank 31 may be connected to the spindle of a vehicle. A suitable gasket 40 may be interposed between the plate portion 17 and the straight portion 11.

From the foregoing, it is apparent that an adjustable steering knuckle and vibration washer has been provided which is especially suitable for use as part of the steering mechanism of a vehicle. The shank 31 may be connected to a spindle, and the arm 39 may lead to a suitable connection on the steering rod. In the event that any looseness develops it is only necessary to tighten the bolt 27 so that any tendency towards shimmy will be eliminated. The ball 23 can be lubricated by inserting grease or oil into the veins 20 and 25. The washer 32 having the ribs or knurling thereon will provide a positive grip between itself and the adjacent parts so there will be no accidental working loose of these parts. The rubber skirt 30 will prevent loss of lubricant and also prevent dirt from accidentally entering the moving parts. The bolt 27 is adjustable and the washer 32 has a conical shape. The size or dimensions of the parts may be varied in order to meet varying load requirements. The ball 23 permits the shank 31 to pivot through as much as 60 degrees.

The steering device of the present invention can be easily adjusted or repaired in order to eliminate any shimmy action that may occur. The body member and bracket may be made of steel and can be made of scrap metal for emergency repair. This invention is adapted to be used on any vehicle which requires independent steering and which is subject to shock, impact, or vibration which ultimately leads to shimmy. Thus, the sealed lubrication including the grease veins will increase the life expectancy of the device and there will be a minimum of wear on the ball and shank.

I claim:

1. In a steering knuckle, a body member including a sleeve portion and a plate portion, an arm extending transversely from said sleeve portion, a bracket arranged contiguous to said body member and including a finger seated in said sleeve portion and a flat portion arranged adjacent to said plate portion, there being opposed cooperating sockets in said plate and flat portions, a ball seated in said sockets, a shank extending from said ball, a securing element extending through said finger and arranged in engagement therewith, and a head mounted on an end of said securing element.

2. In a steering knuckle, a body member including a sleeve portion and a plate portion, an arm extending transversely from said sleeve portion, a bracket arranged contiguous to said body member and including a finger seated in said sleeve portion and a flat portion arranged adjacent to said plate portion, there being opposed cooperating sockets in said plate and flat portions, a ball seated in said sockets, a shank extending from said ball, a securing element extending through said finger and arranged in engagement therewith, a head mounted on an end of said securing element, and a washer circumposed on said securing element and interposed between said head and sleeve portion.

3. In a steering knuckle, a body member including a sleeve portion and a plate portion, an arm extending transversely from said sleeve portion, a bracket arranged contiguous to said body member and including a finger seated in said sleeve portion and a flat portion arranged adjacent to said plate portion, there being opposed cooperating sockets in said plate and flat portions, a ball seated in said sockets, a shank extending from said ball, a securing element extending through said finger and arranged in engagement therewith, a head mounted on an end of said securing element, a washer circumposed on said securing element and interposed between said head and sleeve portion, said washer including an annular conical member provided with a central opening, and a plurality of radially extending ribs arranged on each surface of said washer.

4. A steering knuckle comprising a body member provided with a plate portion and a sleeve, said plate portion having a socket therein, there being a plurality of spaced lubrication grooves communicating with said socket, said plate portion being provided with an opening for the ingress therethrough of a lubricating medium, a bracket arranged contiguous to said body member and provided with a straight portion having a socket for cooperation with the socket in said plate portion, there being lubrication grooves in said straight portion, said sleeve being provided with a chamber therein, a finger extending from said straight portion and seated in said chamber, there being a threaded bore in said finger, a securing element having a threaded stem arranged in engagement with said bore, a head mounted on the outer end of said stem, a washer circumposed on said stem and interposed between said head and sleeve, a ball movably mounted in said sockets, a shank secured to said ball, a resilient skirt secured to the outer portion of said bracket, said washer including a curved body portion provided with a central opening for the projection therethrough of said stem, and a plurality of radially extending ribs on each surface of said washer.

SAM GORE.

References Cited in the file of this patent

UNITED STATES PATENTS

| Number | Name | Date |
|---|---|---|
| Re. 19,116 | Olson | Mar. 13, 1934 |
| 684,673 | Clark | Oct. 15, 1901 |
| 1,714,708 | Winning | May 28, 1929 |
| 1,923,647 | Vera | Aug. 22, 1933 |
| 2,054,082 | Hufferd | Sept. 15, 1936 |
| 2,352,699 | Ennis | July 4, 1944 |
| 2,488,979 | Kogstrom | Nov. 22, 1949 |

FOREIGN PATENTS

| Number | Country | Date |
|---|---|---|
| 13,685 | Great Britain | June 13, 1891 |
| 101,329 | Switzerland | Sept. 17, 1923 |